US006116538A

United States Patent [19]

Häfelfinger

[11] Patent Number: 6,116,538

[45] Date of Patent: Sep. 12, 2000

[54] ACCESSIBLE UTILITY SPACE COMPRISING A CARRIER BALLOON

[76] Inventor: Robert Häfelfinger, Hauptstrasse 60, Sissach, Switzerland, CH-4450

[21] Appl. No.: 09/038,215

[22] Filed: Mar. 11, 1998

[30] Foreign Application Priority Data

Mar. 17, 1997 [CH] Switzerland .............................. 632/97

[51] Int. Cl.7 ................................ B64B 1/40; B64B 1/50

[52] U.S. Cl. ................................................ 244/31; 244/33

[58] Field of Search ................................ 244/24, 30, 31, 244/33, 125, 127, 128; D21/84; 359/446, 451

[56] References Cited

U.S. PATENT DOCUMENTS

| | | | |
|---|---|---|---|
| 701,510 | 6/1902 | Samorski | 244/33 |
| 1,078,614 | 11/1913 | Donath | 244/33 |
| 1,170,367 | 2/1916 | Van Duzer | 244/33 |
| 1,430,393 | 9/1922 | Lynde | 244/31 |
| 1,478,382 | 12/1923 | Max Zu Lynar Passey-de Chimang | 244/33 |
| 2,707,603 | 5/1955 | Moore et al. . | |
| 3,432,122 | 3/1969 | Flickinger et al. . | |
| 3,933,326 | 1/1976 | Schauffler . | |
| 4,762,295 | 8/1988 | Yon, Jr. | 244/30 |
| 4,773,617 | 9/1988 | McCampbell | 244/30 |
| 5,813,627 | 9/1998 | Huntington | 244/33 |

FOREIGN PATENT DOCUMENTS

| | | |
|---|---|---|
| 3628133 | 2/1988 | Germany . |
| WO92/06002 | 4/1992 | WIPO . |

*Primary Examiner*—Peter M. Poon
*Assistant Examiner*—Charles R. Ducker, Jr.
*Attorney, Agent, or Firm*—Selitto & Associates

[57] ABSTRACT

A suspended utility space designed as a captive balloon comprises a carrier balloon which is filled with lifting gas and into which an accessible inner space is incorporated. The carrier balloon is a vertically oriented ellipsoid. The accessible inner space is arranged in the lower part of the carrier balloon. The vertical orientation of the ellipsoidal carrier balloon and the arrangement of the inner space in the lower part of the carrier balloon result in a suspension behavior which is stable under calm conditions. The suspended utility space according to the invention has a larger advertising area visible from the ground and a more effectively utilizable inner space than a spherical airship of comparable size.

22 Claims, 4 Drawing Sheets

ACCESSIBLE UTILITY SPACE COMPRISING A CARRIER BALLOON

FIELD OF THE INVENTION

The present invention relates to a suspended utility space with a carrier balloon which is filled with lifting gas.

BACKGROUND OF THE INVENTION

A utility space is, a unit comprising an essentially closed accessible space, in which, presentations of all kinds, for example film or slide shows, theater plays, concerts etc., can be presented to the people present in the space, or which can also be used, for residential purposes, as a restaurant, or for other uses.

Utility spaces are sometimes used as presentation rooms, in the case of temporary exhibitions which do not take place in permanent exhibition rooms. These utility spaces, for example, tents, are often erected especially for the exhibition and are dismantled again afterwards. However, this entails considerable cost and is time-consuming.

In addition, utility spaces used as presentation rooms, which are transportable, such as, for example, containers, or which are incorporated directly into motor trucks, are also known. However, these utility spaces are of relatively small size in order to make it possible for them to be displaced in an uncomplicated way.

In the case of the cigar-shaped airships, for example Zeppelins, which are well known today, a possibly present utility space is arranged on the underside outside the carrier balloon. Moreover, airships of this type require a plurality of trim ballonets for stabilization in the air and rudders for forward movement, making them very costly to produce and operate.

Tests were therefore undertaken in order to avoid the disadvantages of these airships. WO 92/06002 describes a spherical airship, into the carrier balloon of which, said balloon being filled with lifting gas, an accessible inner space is incorporated. Trim ballonets for stabilization in the air are superfluous because of the spherical shape of the airship. Control during flight is carried out by varying the power of two external motors and by adjusting the angles of incidence of control surfaces arranged behind the motors. Such a spherical airship is more cost-effective to produce and operate than the known cigar-shaped airship. However, due to the spherical shape, the effective advertising area visible from the ground is not ideal and the inner space cannot be utilized optimally.

OBJECTS OF THE INVENTION

In light of the disadvantages of the hitherto known suspended utility spaces described above, the invention is based on the following object. A utility space of the initially mentioned type is to be provided, which, in the case of low wind force, is suspended in the air in a stable manner and has a larger advertising area visible from the ground and a more effectively utilizable inner space than a spherical airship of comparable size.

This object is achieved by means of the suspended utility space according to the present invention. Preferred design variants are also disclosed.

SUMMARY OF THE INVENTION

The essence of the invention is that, in the case of a suspended utility space having a carrier balloon which is filled with lifting gas and into which an accessible inner space is incorporated, the carrier balloon is a vertically orientated ellipsoid and the accessible inner space is arranged in the lower part of the carrier balloon.

The vertical orientation of the ellipsoidal carrier balloon and the arrangement of the inner space in the lower part of the carrier balloon result in a suspension behavior which is stable under calm conditions. Since the lifting gas space above the inner space is comparatively higher than in a spherical airship, the suspended utility space according to the invention can hold a higher maximum load, or the spherical airship has to have a much larger diameter, thus entailing a flatter and therefore nonoptimal inner space. As regards the advertising area, a larger part of the outer surface is visible from the ground in the case of a vertical ellipsoid than in the case of a sphere.

The desired uses, for example presentations, take place inside the inner space which may be designed for a large number, for example 150 guests.

The accessible inner space is preferably designed as a ballonet of variable volume, which is under excess pressure and by means of which the expansion of the lifting gas at higher flight altitudes can be compensated. It thereby becomes possible for the suspended utility space to ascend to relatively high flight altitudes, for example 1,000 m, this being associated with changes in volume of the inner space which are of visual interest to the passengers.

In a preferred design variant, the inner space is designed as a presentation room, in which, in addition to projection means for projecting images onto the inside of a flexible inner balloon envelope or inner envelope and/or spotlights and/or loudspeakers, are also arranged reclining seats which enable the passengers to have a comfortable view of the images projected onto the inner balloon envelope or inner envelope above them.

The suspended utility space advantageously has an airlock which makes it possible to enter and leave the accessible inner space, with excess pressure being maintained in the inner space, the airlock preferably being designed as a reception room for a multiplicity of passengers and having one or more observation windows. During a balloon trip, the passengers may then, according to choice, alternately enjoy the view, possibly partake of something at a hospitality bar and treat themselves to the presentations in the inner space.

A pilot cabin can be arranged underneath the carrier balloon and hung on the inner space or on the airlock, for example by means of a ball joint. This pilot cabin is advantageously designed to be floatable, so that the suspended utility space can also be placed on a river or lake.

In a design variant which is also preferred, the envelope of the carrier balloon consists at least partially of a transparent material. The outside of the inner space can thereby be made visible from outside, so that the entire suspended utility space gives a visually interesting impression and advertising can be affixed to the outside of the inner space. If desired, solar cells can be arranged on the envelope for current generation.

The suspended utility space can advantageously be designed as a captive balloon, thus allowing the balloon to ascend and descend and passengers to embark and disembark quickly, safely and with little involvement of personnel.

BRIEF DESCRIPTION OF THE DRAWINGS

The suspended utility space according to the invention is described in more detail below by means of two exemplary embodiments with reference to the accompanying drawings in which.

DETAILED DESCRIPTION OF THE INVENTION

FIG. 1

Figure 1:
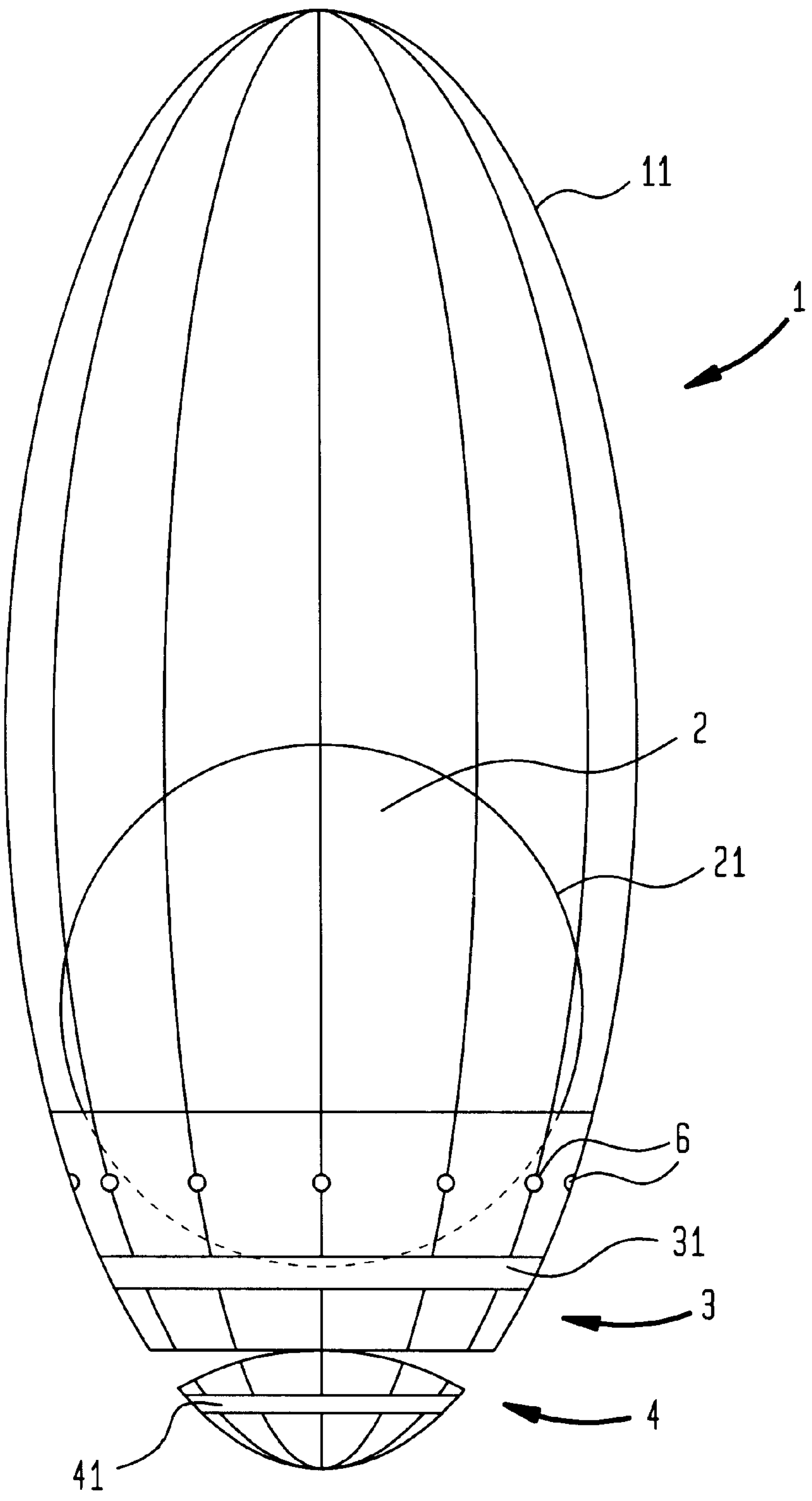
FIG. 1 shows a side view of a first exemplary embodiment of a suspended utility space according to the invention, designed as a presentation room and having a partially transparent carrier balloon envelope.
Figure 2:
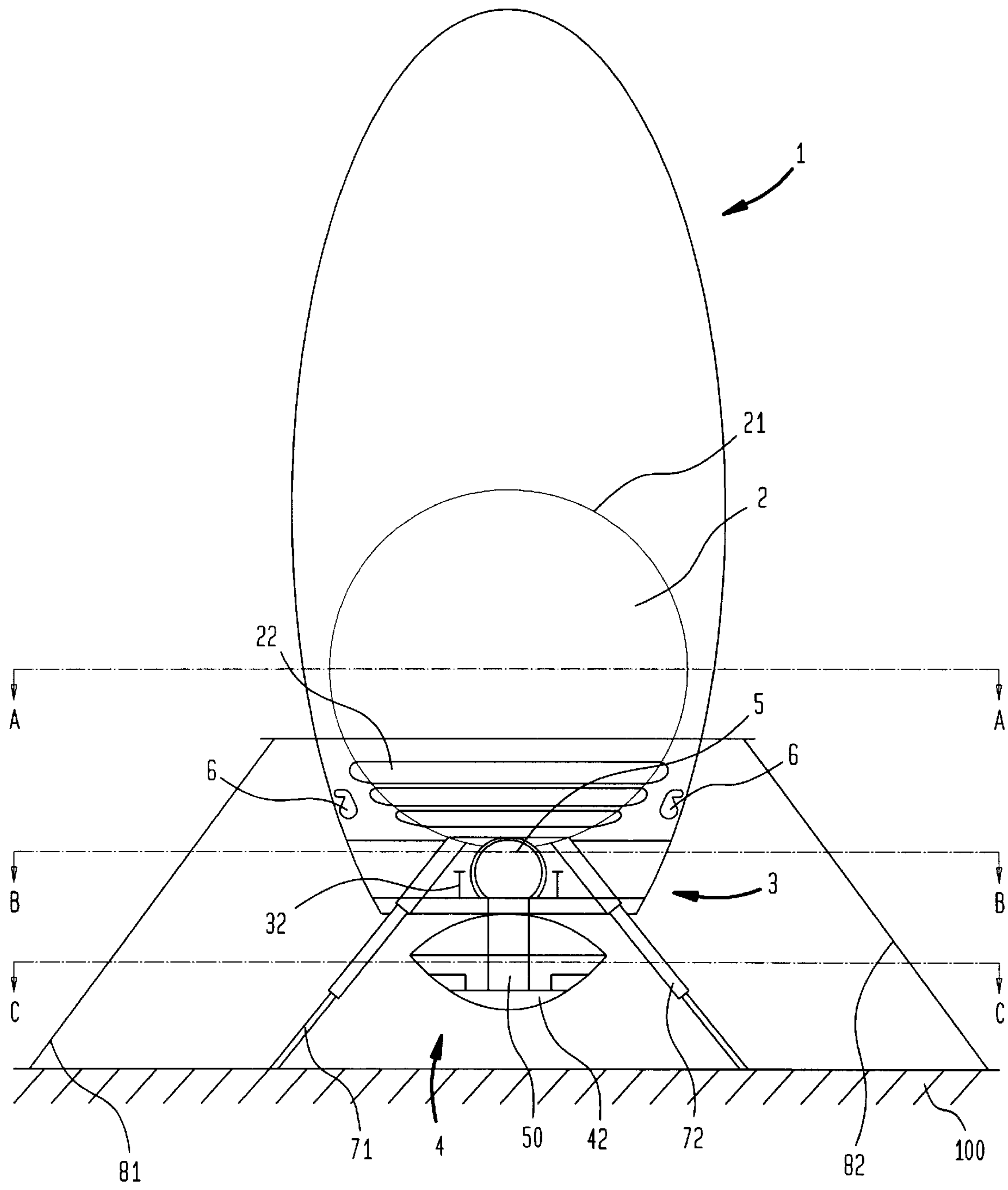
FIG. 2 shows a section through a utility space according to FIG. 1 supported on the ground.
Figure 3:
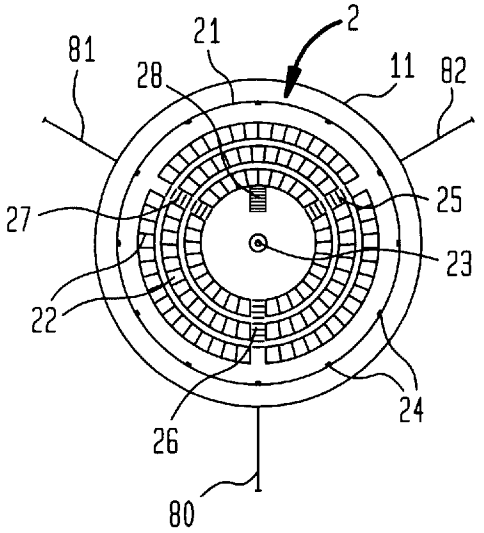
FIG. 3 shows a section through the utility space of FIG. 2 along the line A—A.
Figure 4:
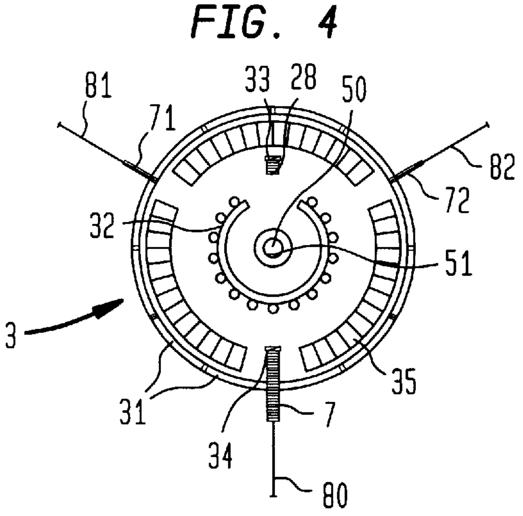
FIG. 4 shows a section through the utility space of FIG. 2 along the line B—B.
Figure 5:
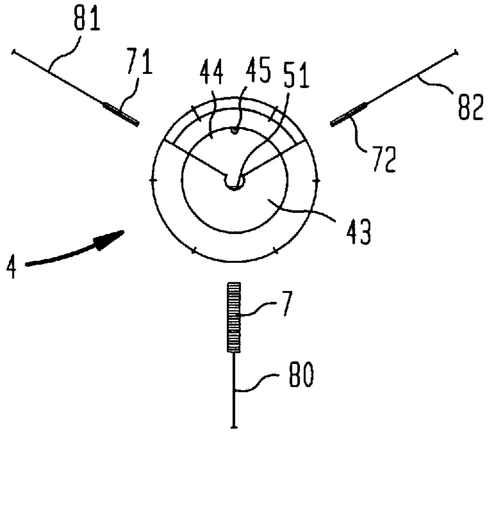
FIG. 5 shows a section through the utility space of FIG. 2 along the line C—C.
Figure 6:
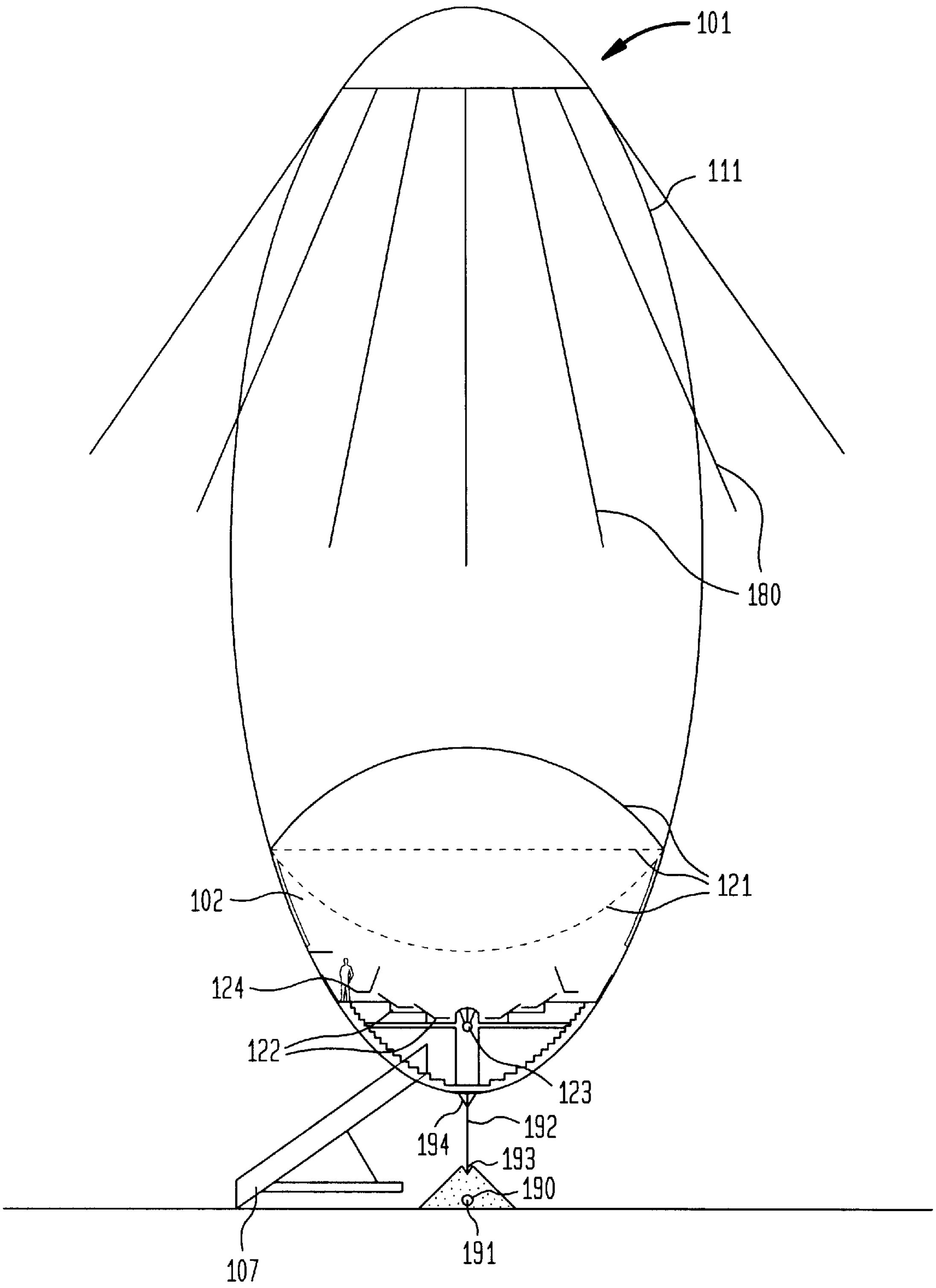
FIG. 6 shows a partially sectional side view of a suspended utility space according to the invention designed as a captive balloon.

The suspended utility space illustrated comprises a carrier balloon 1 with a partially transparent carrier balloon envelope 11. The carrier balloon 1 is filled with a lifting gas, for example, noncombustible helium. An inner space 2 in the form of an inner balloon with an inner balloon envelope 21 is arranged within the carrier balloon 1, said inner space serving at the same time as a utility space and as a ballonet, by means of which the expansion of the lifting gas at higher flight altitudes can be compensated. For this purpose, the inner space 2 is filled with air which is under slight excess pressure, personal comfort being ensured by means of an air conditioning system. By means of electrically driven blowers, air lines with valves, and a regulating device, the volume of the inner space or the ballonet can be adapted to the respective flight altitude, so that the carrier balloon 1 is always filled to tautness.

That part of the inner space 2 which is concealed by an opaque part of the carrier balloon envelope 11 is represented by a dashed line.

Arranged underneath the inner space 2 is an airlock 3 which is designed as a reception room for a multiplicity of passengers and which makes it possible to enter and leave the inner balloon 2, with the excess pressure being maintained. The airlock 3 is provided with observation windows 31. A pilot cabin 4 with windows 41 for the pilot is hung in an articulated manner on the airlock 3.

The suspended utility space is driven and controlled by means of drive devices 6 mounted on the carrier balloon 1. The drive devices 6 may comprise, for example, air nozzles or electric motors, in order to rotate the suspended utility space or move it forward in one direction.

The following statement applies to the whole of the rest of the description. If reference numerals are contained in a Figure, in order to ensure unambiguity in the drawing, but are not explained in the description text associated directly with it, reference is made to the mention of these in the preceding figure descriptions.

FIG. 2

The utility space, here, is supported on the ground 100 via three standing legs, which may or may not be extendable or of a swing-out type (only the two standing legs 71 and 72 being visible in this sectional illustration). The carrier balloon 1 is fixed to the ground 100 by means of three tension cables, only the tension cables 81 and 82 being visible.

A ball joint 5 serves for connecting the pilot cabin 4 and airlock 3 and has, adjoining it, a tube 50, through which it is possible to climb down from the airlock 3 to the pilot cabin 4. A water tank 42, which serves for receiving ballast water, is arranged in the bottom of the pilot cabin 4. The airlock 3 designed as a reception room has a hospitality bar 32.

The inner space 2 is provided with reclining seats 22 which enable the passengers to have a comfortable view of the images projected onto the inner balloon envelope 21 above them.

FIG. 3

Inside the inner space 2 can be seen three rows of reclining seats 22 which are accessible via stairs 25, 26, 27. A multiplicity of projectors 24 are mounted on the inner balloon envelope 21 above the reclining seats 22, whilst a central projector 23 is arranged in the middle of the reclining seats 22. Stairs 28 lead down from the inner balloon 2 to the airlock 3.

All three tension cables 80, 81 and 82 can also be seen in this illustration.

FIG. 4

Stairs 7, which serve at the same time as a third standing leg in addition to the standing legs 71 and 72, are provided for entering the airlock 3 from outside. The airlock-side accesses to the stairs 7 and 28 are provided with airlock doors 34 and 33. A ladder 51 for climbing down into the pilot cabin 4 is arranged inside the tube 50. The airlock 3 is designed as a reception room by means of the observation windows 31, hospitality bar 32 and seats 35.

FIG. 5

The pilot cabin 4 is subdivided into a part 43 for technical equipment and a pilot part 44 having the control apparatus 45.

FIG. 6

In this second exemplary embodiment, the suspended utility space is designed as a captive balloon. It comprises a carrier balloon 101 with a carrier balloon envelope 111 and with restraining ropes 180. The carrier balloon 101 is once again filled with a lifting gas, for example noncombustible helium. An inner space 102 is partitioned off in the lower part of the carrier balloon 101 by means of a flexible inner envelope 121 and serves at the same time as a utility space and as a ballonet, by means of which the expansion of the lifting gas at higher flight altitudes can be compensated. As in the first exemplary embodiment, the inner space 102 is filled with air which is under slight excess pressure, and the volume of the inner space or of the ballonet is adapted to the respective flight altitude by means of electrically driven blowers, air lines with valves and a regulating device. The inner envelope 121 is shown, here, in three different positions which result in three different inner space volumes.

Inside the inner space 102 can be seen two rows of reclining seats 122 and one row of seats 124 facing outwards. Images can be projected onto the inner envelope 121 by means of a central projector 123, said images appearing differently, depending on the envelope position, that is to say changing during the ascent and descent of the suspended utility space.

The suspended utility space is anchored via a winch 191 fastened to the ground or to a raft and having a winch rope 192, by means of which a nose cone 194 mounted on the lower end of the carrier balloon 101 can be drawn into a conical funnel 193 of a coupling 190 having movable holding fingers for locking and releasing the nose cone 194. The ascent and descent of the suspended utility space can be controlled by means of the winch 191. In a high wind, the suspended utility space is braced by means of the restraining ropes 180.

A displaceable staircase 107 serves for the embarkation and disembarkation of the passengers.

Many design variations and uses can be implemented for the suspended utility spaces described above. It may also be mentioned expressly here that the inner space does not necessarily have to be arranged completely within the carrier balloon, but may also project partially from the latter.

What is claimed is:

1. A suspended utility space, comprising a carrier balloon having an outer envelope filled with lifting gas and an accessible inner space, the carrier balloon being a vertically oriented ellipsoid and the accessible inner space being arranged in a lower part of the carrier balloon, wherein the accessible inner space is a ballonet of variable volume, which is under excess pressure and by means of which the expansion of the lifting gas at higher flight altitudes can be compensated.

2. The suspended utility space of claim 1, further comprising an airlock which makes it possible to enter and leave the accessible inner space, with excess pressure being maintained.

3. The suspended utility space of claim 2, wherein the airlock is designed as a reception room for a multiplicity of passengers and is provided with at least one observation window.

4. The suspended utility space of claim 2, further comprising a pilot cabin arranged underneath the carrier balloon and hung on the airlock by means of a ball joint, the pilot cabin being floatable.

5. A suspended utility space, comprising a carrier balloon having an outer envelope filled with lifting gas and an accessible inner space, the carrier balloon being a vertically oriented ellipsoid and the accessible inner space being arranged in a lower part of the carrier balloon; and a pilot cabin arranged underneath the carrier balloon and hung on the accessible inner space by means of a ball joint, the pilot cabin being floatable.

6. A suspended utility space, comprising a carrier balloon having an outer envelope filled with lifting gas and an accessible inner space, the carrier balloon being a vertically oriented ellipsoid and the accessible inner space being arranged in a lower part of the carrier balloon, wherein the accessible inner space is of balloon-like design and is delimited at least partially by a flexible inner envelope.

7. The suspended utility space of claim 6, wherein the accessible inner space is designed as a presentation space and is provided with projection means for projecting images onto an inside surface of the flexible inner envelope.

8. The suspended utility space of claim 7, wherein the accessible inner space has spotlights.

9. The suspended utility space of claim 7, wherein the accessible inner space has loudspeakers.

10. The suspended utility space of claim 7, wherein the accessible inner space has reclining seats.

11. The suspended utility space of claim 7, wherein the flexible inner envelope is an inner balloon envelope.

12. The suspended utility space of claim 7, wherein the flexible inner envelope partitions off the accessible inner space in the lower part of the carrier balloon.

13. The suspended utility space of claim 6, wherein the flexible inner envelope is an inner balloon envelope.

14. The suspended utility space of claim 6, wherein the flexible inner envelope partitions off the accessible inner space in the lower part of the carrier balloon.

15. A suspended utility space, comprising a carrier balloon having an outer envelope filled with lifting gas and an accessible inner space, the carrier balloon being a vertically oriented ellipsoid and the accessible inner space being arranged in a lower part of the carrier balloon, wherein the outer envelope of the carrier balloon is at least partially transparent.

16. A suspended utility space, comprising a carrier balloon having an outer envelope filled with lifting gas and an accessible inner space, the carrier balloon being a vertically oriented ellipsoid and the accessible inner space being arranged in a lower part of the carrier balloon; and at least three standing legs designed as a ground support for the carrier balloon, at least one of the standing legs being designed as stairs.

17. The suspended utility space of claim 16, wherein each of the standing legs is extendable.

18. The suspended utility space of claim 16, wherein each of the standing legs is of a swing-out type.

19. A suspended utility space, comprising a carrier balloon having an outer envelope filled with lifting gas and an accessible inner space, the carrier balloon being a vertically oriented ellipsoid and the accessible inner space being arranged in a lower part of the carrier balloon; and tethering means for tethering the suspended utility space to an anchoring surface, whereby the suspended utility space is a captive balloon.

20. The suspended utility space of claim 19, wherein the tethering means includes a winch.

21. A suspended utility space, comprising a carrier balloon having an outer envelope filled with lifting gas and an accessible inner space, the carrier balloon being a vertically oriented ellipsoid and the accessible inner space being arranged in a lower part of the carrier balloon; and solar cells arranged on the outer envelope, the solar cells being used for current generation.

22. The suspended utility space as in one of claims 1, 2, 5–7, 15, 16, 19, or 21, further comprising at least one drive device for horizontal forward movement.

* * * * *